(12) United States Patent
Kern et al.

(10) Patent No.: US 7,431,399 B2
(45) Date of Patent: Oct. 7, 2008

(54) COMFORT REST FOR A REAR SEAT

(75) Inventors: Christoph Kern, Weil der Stadt (DE); Oswald Kriessler, Simmozheim (DE); Bernd Schmidt, Wildberg-Sulz (DE); Juergen Schrader, Weil im Schoenbuch (DE); Wolfgang Schramm, Rottenburg (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 10/556,295

(22) PCT Filed: May 6, 2004

(86) PCT No.: PCT/EP2004/004826

§ 371 (c)(1),
(2), (4) Date: Dec. 8, 2006

(87) PCT Pub. No.: WO2004/098921

PCT Pub. Date: Nov. 18, 2004

(65) Prior Publication Data

US 2007/0102984 A1    May 10, 2007

(30) Foreign Application Priority Data

May 9, 2003  (DE)  ............................... 103 20 748

(51) Int. Cl.
A47C 1/10  (2006.01)

(52) U.S. Cl. .................. 297/403; 297/391; 297/408; 297/409

(58) Field of Classification Search ............. 297/391, 297/408, 409, 403; 280/751
See application file for complete search history.

(56) References Cited

U.S. PATENT DOCUMENTS

| 4,623,166 A | * | 11/1986 | Andres et al. ............... 280/751 |
| 4,711,494 A | * | 12/1987 | Duvenkamp ................ 297/403 |
| 4,834,456 A | * | 5/1989 | Barros et al. ................ 297/403 |
| 5,095,257 A | | 3/1992 | Ikeda |
| 6,074,011 A | * | 6/2000 | Ptak et al. .................... 297/408 |
| 6,371,559 B1 | * | 4/2002 | Kienzle et al. .............. 297/403 |

FOREIGN PATENT DOCUMENTS

| DE | 3638261 | * | 6/1987 |
| DE | 4225707 | | 2/1994 |
| DE | 4231224 | | 3/1994 |
| EP | 970848 | | 1/2000 |
| FR | 2672550 | | 8/1992 |

* cited by examiner

Primary Examiner—Laurie K Cranmer
(74) Attorney, Agent, or Firm—Crowell & Moring LLP

(57) ABSTRACT

A headrest of a motor vehicle seat can be folded down into an inoperative position. The headrest has a headrest body and a headrest bracket which are mechanically connected in such a manner, via a bearing part having a sliding bearing and a pivot bearing that a vertical displacement and a pivoting about a horizontal pivot axis arranged perpendicularly to the longitudinal axis of the vehicle are achievable.

23 Claims, 2 Drawing Sheets

COMFORT REST FOR A REAR SEAT

BACKGROUND AND SUMMARY OF THE INVENTION

The invention relates to a motor vehicle seat with a headrest which has a headrest bracket and a headrest body and is arranged on a seat back so that it can pivot about a first pivot axis, the first pivot axis being arranged essentially horizontally and perpendicularly to a longitudinal axis of the vehicle.

DE 42 25 707 A1 shows headrest that is pivotable in order not to impair the field of view of the driver during reversing.

A foldable headrest for a rear seat back is also disclosed in DE 42 31 224 A1. In this case, the headrest has a supporting cushion arranged on a supporting bracket which can be pivoted relative to a rear seat. The supporting cushion is connected fixedly, nonpivotably and nondisplaceably to the supporting bracket.

The present invention is based on an object of providing a headrest that ensures an optimum adjustment for the passenger.

The object has been achieved according to the invention by arranging the headrest body on the headrest bracket via a pivot bearing with a second pivot axis arranged essentially parallel to the first pivot axis, and/or via a sliding bearing acting essentially perpendicularly to the first pivot axis. The effect achieved by this is that the headrest or the headrest body can be adjusted in its height and in its inclination in accordance with the passenger. In addition, this adjustability ensures an optimum position in the inoperative position of the headrest, in which it is pivoted rearwards. The pivotability into the inoperative position makes it possible for the seat back to be designed without a recess for the headrest, which considerably reduces the outlay on production.

For this purpose, it is advantageous if the headrest body is arranged on a bearing part via the sliding bearing or the pivot bearing, and the bearing part is arranged on the headrest bracket via the pivot bearing or the sliding bearing. The use of the bearing part ensures a simple structural design of the two-part adjustability of the headrest or of the headrest body.

According to one aspect of the invention, an additional possibility for the sliding bearing and/or the pivot bearing to have at least one mechanical latching element and/or at least one actuating element, the actuating element being of electric and/or pneumatic design. By way of the latching means, the headrest is held in the desired position after the manual adjustment movement. The use of actuating elements connects an automatic adjustment of the headrest or of the headrest body.

Furthermore, it is advantageous for the actuating element to be assigned a prestressing element opposing the actuating movement. The actuating element can therefore be configured such that it acts in one direction, like, for example, a pneumatically activated expansion bellows. In addition the venting of an actuating element of this type is assisted by, in addition to a valve opening, the prestressing element which is prestressed by the actuating movement of the actuating element, which actuating movement is to be guided back.

For this purpose, it is also advantageous for the first actuating element and the first prestressing element to be arranged between the headrest body and the bearing part, and for the second actuating element and the second prestressing element to be arranged between the bearing part and the headrest bracket. The sliding bearing and the pivot bearing can therefore be controlled and adjusted independently of each other.

According to a currently preferred embodiment of the invention, provision is finally made for the pivot bearing and/or the sliding bearing, in an inoperative position of the headrest. The inoperative position is pivoted about the first pivot axis, to have a pivoting or inoperative position. It is also advantageous for the pivot bearing and/or the sliding bearing, in a position pivoted into the inoperative position (R) of the headrest, to permit a pivoting of the headrest about the headrest bracket. In order to pivot the headrest into the inoperative position, the headrest body has to take up a pivoting or inoperative position corresponding to the recess, so that a complete pivoting of the headrest is ensured without affecting the driver's view.

It is of particular importance for the present invention that, before the inoperative position is reached, the actuating element is automatically in a pivoting or inoperative position, by way of the pivoting movement of the headrest and of the headrest bracket. It is also advantageous that, before the inoperative position is reached, the actuating element brings about an automatic pivoting, via the pivoting movement of the headrest and of the headrest bracket. The sensor arrangement used for this purpose permits a fully automatic pivoting of the headrest. In this case, the pivoting may take place with somewhat of a delay until the headrest body has reached the pivoting or inoperative position.

In conjunction with the construction and arrangement according to the invention, it is advantageous if at least one actuating element is assigned an operating element which is arranged in the region of the headrest and/or in the region of a function console and is intended for the passenger. The passenger can therefore adjust the position of the headrest and headrest body as desired when he has taken up his sitting position.

It is furthermore advantageous for a tension device which is guided in the headrest bracket to be arranged between the headrest body and the seat back in such a manner that, in the pivoted inoperative position of the headrest, the sliding bearing and/or the pivot bearing is/are in an inoperative or pivoted position. This ensures, in the case of a manually adjustable headrest and headrest body that the latter takes up the inoperative or the pivoted position when the headrest is pivoted about the pivot axis into the inoperative position.

In addition, it is advantageous for the headrest bracket to have a control line for at least one actuating element or to be designed as a pneumatic control line. The installation of a separate control line between the seat back or the seat console and the headrest is therefore possible in a simplified manner.

Furthermore, it is advantageous for the headrest body to have at least one air-assisted padded element and/or to be of extensible configuration at least in the direction of action of the sliding bearing. The use of an additional padded element ensures an optimum adjustment for the passenger. The extensibility supports this adjustability in the case of the manually operable headrest. So that the air-assisted padded element can deploy its action, the headrest body should likewise be of elastic configuration.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

Figure 1:
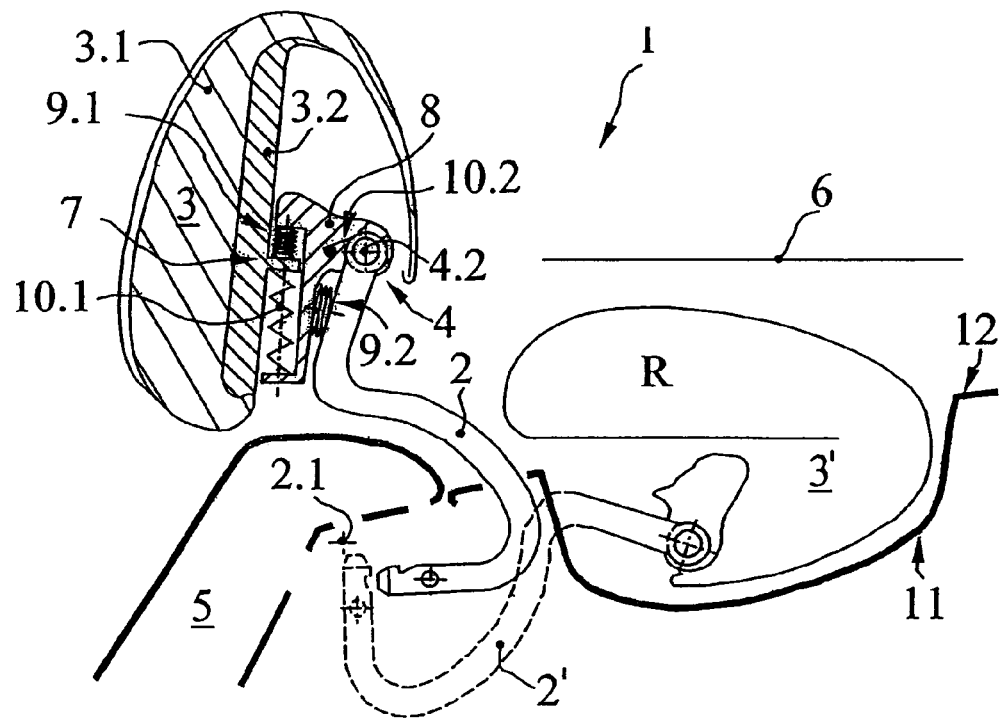
FIG. 1 is a sectional elevational view of a headrest with pneumatic actuating elements in an upright operating position and in an inoperative position.

The headrest 1 according to FIG. 1 includes a headrest body 3 and a headrest bracket 2. In this case, the headrest body 3 is connected mechanically to the headrest bracket 2 via a bearing part 8. The headrest 1 is part of a seat back 5 (not illustrated) and can be pivoted in the region of this seat back 5 via a pivot axis 2.1 or a pivot bearing from an upright operating position into an inoperative position R (illustrated in partially in dash lines). In the inoperative position R, the headrest body designated 3' in that position is arranged partially within a recess 11 of a motor vehicle body 12.

The headrest body 3 has a padded part 3.1 and a basic body 3.2 which is lined with the padded part 3.1. The basic body 3.2 is connected via a sliding bearing 7 to the bearing part 8 which is arranged on the headrest bracket 2. A first actuating element 9.1 is provided within the sliding bearing 7 or between the sliding bearing 7 in the bearing part 8. The actuating element 9.1 ensures a displacement of the basic body 3.2 at least in one direction in relation to the bearing part 8. In this case, the first actuating element 9.1 is configured as a pneumatic expansion bellows and, when acted upon by compressed air, extends along the movement of the sliding bearing. The first actuating element 9.1 is assigned an opposing, first prestressing element 10.1 which is configured as a compression spring and ensures an actuating force between the bearing part 8 and the basic body 3.2. That actuating force opposes the extension movement of the first actuating element 9.1.

The bearing part 8 is fastened to the headrest bracket 2 via a pivot bearing 4 and can be pivoted relative to the headrest bracket 2 about a pivot axis 4.2. The pivot bearing 4 is assigned a second actuating element 9.2 which ensures an actuating force between the bearing part 8 and the headrest bracket 2 to produce the pivoting movement about the pivot axis 4.2. In this case, the second actuating element 9.2 is likewise configured as a pneumatic expansion bellows and, when acted upon by compressed air, ensures a pivoting movement of the headrest body 3 in the clockwise direction. The second actuating element 9.2 bears against a limb of the bearing part 8, on one hand, and against the headrest bracket 2 on the other hand. The second actuating element 9.2 is likewise assigned a second prestressing element 10.2 which is configured as a torsion spring and generates an actuating force which opposes the actuating movement of the second actuating element 9.2 and varies proportionally to the pivoting movement. In the illustrated position of the headrest body 3, the headrest 1 can be pivoted about the pivot axis 2.1 into the inoperative position R within the recess 11 of the motor vehicle body 12.

Figure 2:
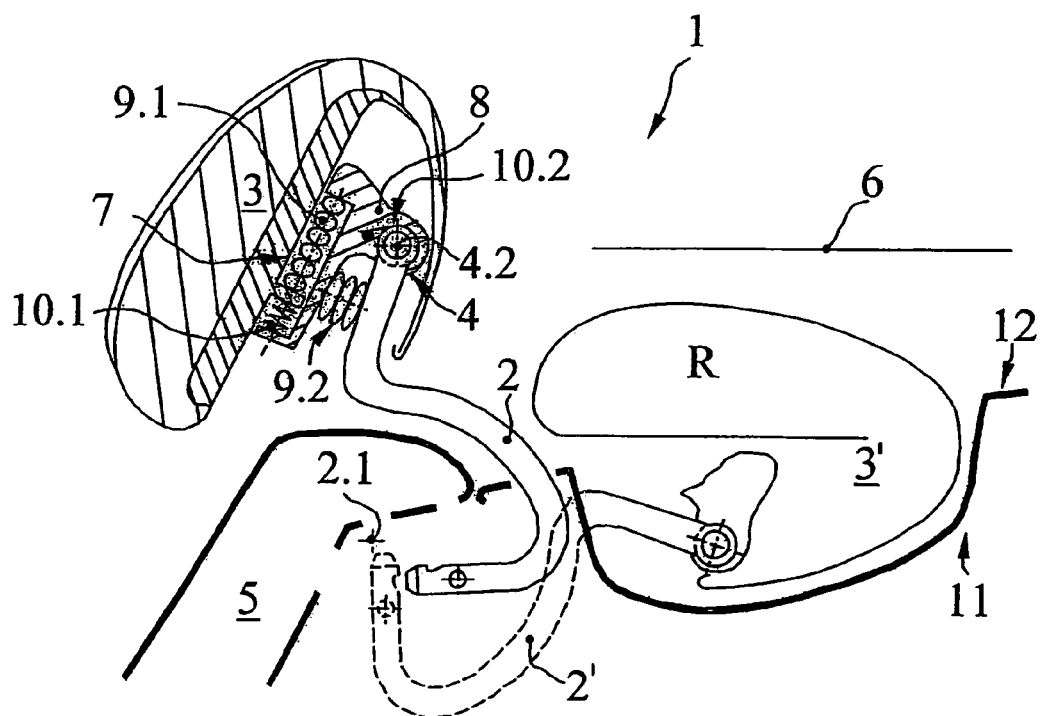
FIG. 2 is a sectional view similar to FIG. 1 of a headrest but in a further operating position and in an upright inoperative position.

According to FIG. 2, the headrest body 3 is situated in a lower end position with respect to the sliding bearing 7 and in a front end position with respect to the pivot bearing 4. Via the described pivoting and displacement possibilities of the headrest body 3, the headrest body 3 can be adjusted continuously within the upper, rear end position according to FIG. 1 in the lower, front end position according to FIG. 2.

In order to pivot the headrest 1 about the pivot axis 2.1 into the inoperative position R, the headrest body 3 is moved into the upper, rear inoperative or pivoted position. For this purpose, the pneumatic actuating elements 9.1, 9.2 are vented. This takes place via sensors (not illustrated) which ensure a corresponding activation of the pneumatic actuating elements 9.1, 9.2. The particular end position is reached by the spring force of the prestressing elements 10.1, 10.2. However, for moving into the inoperative position any other pivoted position of the headrest body 3 is also contemplated, depending on the inoperative position.

Figure 3:
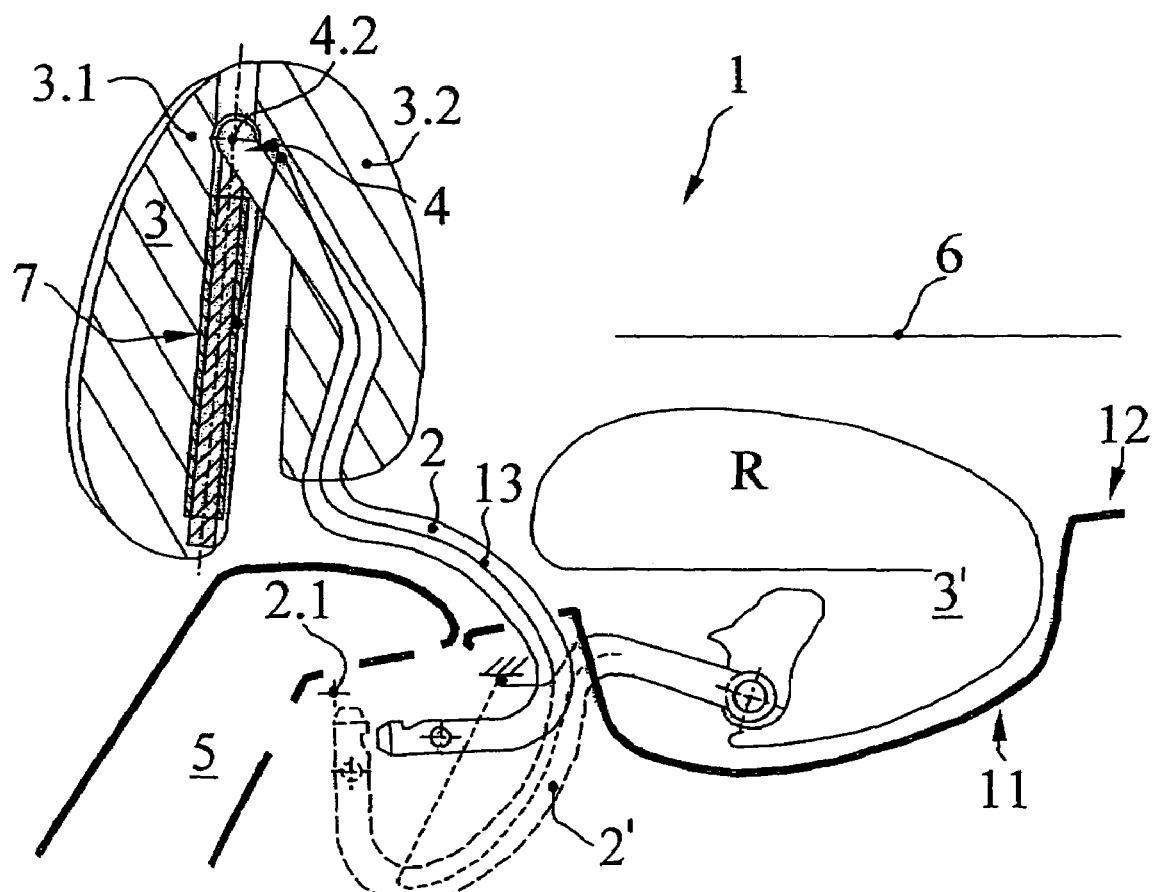
FIG. 3 is a sectional view of a headrest with a manual actuating element in an operating position and in an inoperative position.

According to FIG. 3, the headrest body 3 likewise has a common sliding bearing 7 with the headrest bracket 2, but the sliding bearing can be operated manually. In this case, the sliding bearing 7 has a mechanical latching mechanism (not illustrated) to ensure that the headrest body 3 is firmly clamped in various positions. A tensioner 13 is provided between the sliding bearing 7 and the pivot axis 2.1 of the motor vehicle body 12 to ensure that the headrest body 3 moves into the upper, rear inoperative or pivoted position when the headrest 1 is pivoted from the operating position about the pivot axis 2.1 into the inoperative position R.

The tensioner 13 in this case is arranged at least partially within the headrest bracket 2 and is connected, on the one hand, to the sliding bearing 7 and, on the other hand, to the motor vehicle body 12. The difference between the point of attachment of the tensioner 13 to the motor vehicle body 12 is shorter in the operating position than in the inoperative position R. This difference in distance ensures, when the headrest 1 is pivoted about the pivot axis 2.1, that the headrest body 3 is drawn upward and rearward with respect to the headrest bracket 2.

According to FIG. 3, the headrest body 3 has a padded back part 3.1' which is connected fixedly to the headrest body 3 or to the padded part 3.1. In this case, the back part 3.1' and the padded part 3.1 are connected at their upper end via an expansion bellows, so that a pivoting of the padded part 3.1 about the pivot axis 4.2 relative to the back part 3.1' can occur.

The invention claimed is:

1. A motor vehicle seat, comprising a headrest having a headrest bracket and a headrest body and being arrangeable on a seat back pivotable toward a vehicle rear direction about a first pivot axis arranged in the seat back substantially horizontally and perpendicularly to a vehicle longitudinal axis, wherein the headrest body is operatively arranged on the headrest bracket via a pivot bearing with a second pivot axis arranged substantially parallel to the first pivot axis, and via a sliding bearing acting substantially perpendicularly to the first pivot axis.

2. The seat as claimed in claim 1, wherein the headrest body is operatively arranged on a bearing part via one of the sliding bearing and the pivot bearing, and the bearing part is operatively arranged on the headrest bracket via one of the pivot bearing and the sliding bearing.

3. The seat as claimed in claim 1, wherein at least one of the sliding bearing and the pivot bearing has at least one or more mechanical latches and/or at least one or more actuating elements with the latter being of electric and/or pneumatic configuration.

4. The seat as claimed in claim 3, wherein the headrest body is operatively arranged on a bearing part via one of the sliding bearing and the pivot bearing, and the bearing part is operatively arranged on the headrest bracket via one of the pivot bearing and the sliding bearing.

5. The seat as claimed in claim 3, wherein the at least one actuating element is assigned a prestressing element opposing an actuating movement thereof.

6. The seat as claimed in claim 5, wherein a first of at least one actuating element and its associated prestressing element are arranged between the headrest body and the bearing part, and a second of the at least one actuating element and its associated prestressing element are arranged between the bearing part and the headrest bracket.

7. The seat as claimed in claim 3, wherein the at least one actuating element is assigned an operating element operatively arranged in a region for access by a vehicle passenger.

8. The seat as claimed in claim 3, wherein the headrest bracket has a control line for at least one actuating element or is configured as a pneumatic control line.

9. The seat as claimed in claim 1, wherein at least one of the pivot bearing and the sliding bearing, in a position pivoted into an inoperative position of the headrest, permits a pivoting of the headrest about the headrest bracket.

10. The device as claimed in claim 9, wherein the at least one actuating element is arranged to bring about an automatic pivoting, before the inoperative position is reached via pivoting movement of the headrest and the headrest bracket.

11. The seat as claimed in claim 1, wherein a tensioner means is guided in the headrest bracket and is arranged between the headrest body and the seat back such that, in a pivoted inoperative position of the headrest, at least one of the sliding bearing and the pivot bearing is in an inoperative position.

12. The seat as claimed in claim 1, wherein the headrest body is at least one of provided with at least one air-assisted padded element and is of extensible configuration at least in direction of movement of the sliding bearing.

13. A vehicle headrest having a headrest bracket and a headrest body and being arrangeable on a seat back pivotable in a vehicle rear direction about a first pivot axis arranged in the seat back substantially horizontally and perpendicularly to a vehicle longitudinal axis, wherein the headrest body is operatively arranged on the headrest bracket via a pivot bearing with a second pivot axis arranged substantially parallel to the first pivot axis, and via a sliding bearing acting substantially perpendicularly to the first pivot axis.

14. A vehicle headrest as claimed in claim 13, wherein the headrest body is operatively arranged on a bearing part via one of the sliding bearing and the pivot bearing, and the bearing part is operatively arranged on the headrest bracket via one of the pivot bearing and the sliding bearing.

15. A vehicle headrest as claimed in claim 13, wherein at least one of the sliding bearing and the pivot bearing has at least one mechanical latches and/or at least one or more actuating elements, the latter being of electric and/or pneumatic configuration.

16. A vehicle headrest as claimed in claim 15, wherein the at least one actuating element is assigned a prestressing element opposing an actuating movement thereof.

17. A vehicle headrest as claimed in claim 16, wherein a first of at least one actuating element and its associated prestressing element are arranged between the headrest body and the bearing part, and a second of the at least one actuating element and its associated prestressing element are arranged between the bearing part and the headrest bracket.

18. A vehicle headrest as claimed in claim 15, wherein the at least one actuating element is assigned an operating element operatively arranged in a region for access by a vehicle passenger.

19. A vehicle headrest as claimed in claim 15, wherein the headrest bracket (2) has a control line for at least one actuating element or is configured as a pneumatic control line.

20. A vehicle headrest as claimed in claim 13, wherein at least one of the pivot bearing and the sliding bearing, in a position pivoted into an inoperative position of the headrest, permits a pivoting of the headrest about the headrest bracket.

21. A vehicle headrest as claimed in claim 20, wherein the at least one actuating element is arranged to bring about an automatic pivoting, before the inoperative position is reached via pivoting movement of the headrest and the headrest bracket.

22. A vehicle headrest as claimed in claim 13, wherein a tensioner means is guided in the headrest bracket and is arranged between the headrest body and the seat back such that, in a pivoted inoperative position of the headrest, at least one of the sliding bearing and the pivot bearing is in an inoperative position.

23. A vehicle headrest as claimed in claim 13, wherein the headrest body is at least one of provided with at least one air-assisted padded element and is of extensible configuration at least in a direction of movement of the sliding bearing.

* * * * *